(12) United States Patent
Kokkinos

(10) Patent No.: US 8,699,874 B2
(45) Date of Patent: *Apr. 15, 2014

(54) OPTICAL SIGNAL SHUTOFF MECHANISM AND ASSOCIATED SYSTEM

(75) Inventor: Dimitrios S. Kokkinos, Flushing, NY (US)

(73) Assignee: Verizon Services Corp., Ashburn, VA (US)

( * ) Notice: Subject to any disclaimer, the term of this patent is extended or adjusted under 35 U.S.C. 154(b) by 344 days.

This patent is subject to a terminal disclaimer.

(21) Appl. No.: 13/029,414

(22) Filed: Feb. 17, 2011

(65) Prior Publication Data

US 2011/0135298 A1 Jun. 9, 2011

Related U.S. Application Data

(63) Continuation of application No. 11/539,693, filed on Oct. 9, 2006, now Pat. No. 7,912,369.

(51) Int. Cl.
*H04B 10/08* (2011.01)
*H04B 10/00* (2013.01)

(52) U.S. Cl.
USPC .............................. 398/21; 398/15; 398/171

(58) Field of Classification Search
USPC ....................................... 398/15, 17, 21, 171
See application file for complete search history.

(56) References Cited

U.S. PATENT DOCUMENTS

| | | | |
|---|---|---|---|
| 5,528,409 A | 6/1996 | Cucci et al. | |
| 5,900,959 A | 5/1999 | Noda et al. | |
| 6,317,255 B1* | 11/2001 | Fatehi et al. | 359/341.44 |
| 6,504,630 B1* | 1/2003 | Czarnocha et al. | 398/15 |
| 7,146,098 B1* | 12/2006 | Warbrick | 398/2 |
| 7,359,647 B1* | 4/2008 | Faria et al. | 398/171 |
| 2004/0022197 A1 | 2/2004 | Gagnon | |

* cited by examiner

*Primary Examiner* — Daniel Dobson

(57) ABSTRACT

A mechanism for adjusting or shutting off an optical signal within a network system is provided. The system may include a generating element for providing an optical signal and a bi-directional coupler for transmitting the optical signal to downstream components and fiber links and for transmitting a reflected optical signal based on the reflection characteristics of the downstream components to a converter element. The converter element converts the reflected optical signal to an electrical trigger signal that is used by a processing element to monitor the degradation or operational conditions within the network system. Based on the electrical trigger signal the processing element may adjust or shut off the optical signal at the generating element or at another element within the network system or another network system. The processing element may also send a communication signal to other elements or an operator to indicate unacceptable noise within the network system.

12 Claims, 2 Drawing Sheets

OPTICAL SIGNAL SHUTOFF MECHANISM AND ASSOCIATED SYSTEM

CROSS-REFERENCE TO RELATED APPLICATIONS

Figure 1:
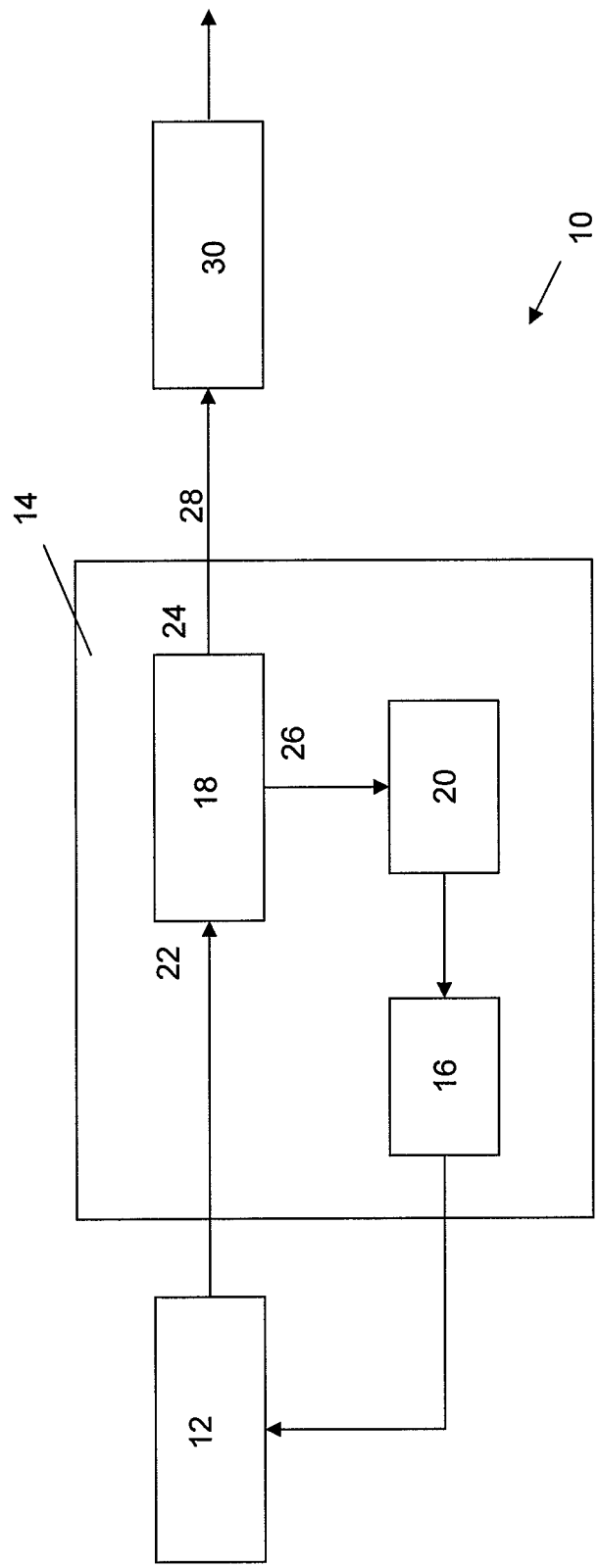

This is a continuation of prior co-pending U.S. patent application Ser. No. 11/539,693, filed on Oct. 9, 2006, titled OPTICAL SIGNAL SHUTOFF MECHANISM AND ASSOCIATED SYSTEM the contents of which are expressly incorporated herein by reference. Benefits under 35 U.S.C. §120 are hereby claimed.

BACKGROUND OF THE INVENTION

With the progress of dense wavelength division multiplexing (DWDM) technology and the development of optical amplifiers (OA), the capacity of optical communications networks is growing and the optical power level in optical links has also increased. Current optical amplifiers used for long haul telecommunications can launch 200-400 mW (milliwatts) of optical power into single mode fibers and next generation systems are expected to reach levels approaching 1 W (1 Watt or 1000 milliwatts). In addition, for current fiber to the premises (FTTP) technology using passive optical networks (PON), the optical power for analog video transport at 1550 nm (nanometers), is 200 mW. At these power levels, radiation safety issues become significant. Accidental cable or fiber breaks and uncoupled or opened connectors may expose the human body to invisible infra-red radiation and cause damage depending on exposure time.

Some of the conventional optical power transport systems include an automatic laser shut-off feature to avoid exposure to radiation. The laser or amplifier power is shut-off at the transmitting end when the optical signal at the receiving end is lost and an optical supervisory channel (OSC) cannot establish communications between the two ends. Although conventional shut-off features may work in cases of a fiber break or an open connector, conventional shut-off devices may be activated by a lossy element of the system or a malfunctioning receiver or OSC. Therefore conventional shut-off features may shut-off the laser or amplifier power unnecessarily. Moreover, conventional shut-off devices cannot provide early detection of increasing reflection levels in the fiber link, which interfere with the transmitted signal, creating phase noise that is converted to intensity noise that degrades the transmitted signal quality.

BRIEF DESCRIPTION OF THE SEVERAL VIEWS OF THE DRAWING(S)

Figure 2:
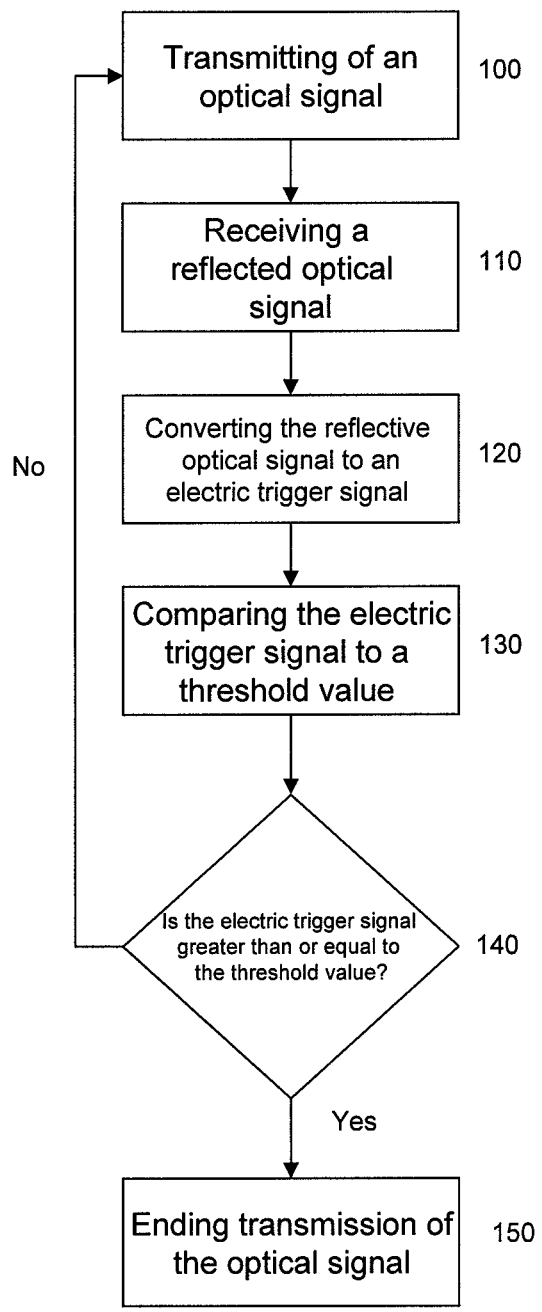

Having thus described the invention in general terms, reference will now be made to the accompanying drawings, which are not necessarily drawn to scale, and wherein:

FIG. 1 illustrates a basic block diagram of an embodiment of the present invention; and FIG. 2 illustrates a basic flow chart of a method according to another embodiment of the present invention.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Embodiments of the present invention provide a shut-off mechanism for a system, such as an optical communication network. According to the embodiment illustrated in FIG. 1, the network system 10 may include an optical signal generating element 12 and the shut-off mechanism 14.

The generating element 12 may be the original source of one or more optical signals for transmitting information through the network system 10, such as a laser, or may be an amplifier or regenerator of optical signals received from another element of the network system 10 or from another network system, such as a repeater or an optical amplifier. The generating element 12 includes an output terminal (un-referenced) for transmitting the optical signals toward a downstream receiving element of the network or to another network. The generating element 12 may also include an input terminal (not shown) for receiving optical signals from another element (not shown) upstream of the generating element 12 within the network system 10 or from another network.

The shut-off mechanism 14 is downstream from the generating element 12. According to the embodiment illustrated in FIG. 1, the shut-off mechanism 14 may be proximate the output terminal of the generating element 12. Positioning the shut-off mechanism 14 proximate the output terminal of the generating element 12 reduces any loss in an optical signal between the two elements 12, 14. The shut-off mechanism 14 generally includes a bi-directional coupler 18, a converter element 20, and a processing element 16.

The bi-directional coupler 18 can include at least a first input port 22, a first output port 24, and a second output port 26. The bi-directional coupler 18 is configured to receive an optical signal from the generating element 12 through the first input port 22 and to transmit the optical signal through the first output port 24, which may also be referred to as the transmitter port, and further downstream in the network system 10 or to another network system. More specifically, downstream of the first output port 24, the optical signal may be transmitted via optical fiber links 28 through or to one or more additional component elements 30 of the network system or to another network. For example, other component elements may be connectors, splitters, and network terminals. As the optical signal travels through the downstream elements and fiber links, at least a part of the optical signal is reflected back upstream toward the bi-directional coupler. The part of the optical signal reflected back is referred to herein as the "reflected optical signal." The bi-directional coupler 18 is configured to receive the reflected signal through the first output port 24 and transmit the reflected signal through the second output port 26, which may also be referred to as a reflectance port.

The converter element 20, such as an optical/electrical converter, is connected to the second output port 26 and is configured to receive the reflected optical signal and convert the received reflected optical signal into an electrical signal, referred to herein as a trigger signal.

The processing element 16 is configured to receive and respond to the trigger signal. Based on the trigger signal or absence of the trigger signal, the processing element may control or adjust the generating element 12. For example, the response of the processing element 16 may be dependent on comparing the trigger signal to a threshold value. If the trigger signal meets or exceeds the threshold value, the processing element 16 may turn or shut off the generating element 12.

The trigger signal generated by the converter element can be made directly proportionate to the corresponding reflected signal. For example, a current amplitude of the trigger signal can be set to approximate an intensity of the reflected signal and, in part, the intensity of the reflected signal is attributable to and indicative of the reflection characteristics of at least the first component element 30 downstream of the bi-directional coupler and the fiber link between the first component element and the bi-directional coupler, referred to herein as the first fiber link 28. A change in the reflection characteristics is likely to lead to a corresponding change in a reflected signal. Generally, the more significant the change in the reflection characteristics the more significant the change in the reflected signal, which in turn leads to a more significant change in corresponding trigger signal. For example an increase in the reflection characteristics can lead to an increase in the reflected signal which can lead to an increase in the trigger signal.

Changes in the reflection characteristics may occur over time through the degradation of the first component element 30 and/or the first fiber link 28 during the life of the system. A gradual change in the reflection characteristics would also create a gradual change or trend in the trigger signal or signals. Abrupt changes may also occur in the reflection characteristics based on the operational condition or status of either the first component element 30 and/or the first fiber link 28 which in turn would result in abrupt changes in a trigger signal or between trigger signals. Examples of operational conditions include a decoupling of the first component element 30 and/or the first fiber link 28 from the system, a break or tear in the first fiber link 28, or a fault within the first component element 30.

The processing element 16, such as a processor, controller, or other computing device, may monitor the trigger signal or signals for trends or abrupt changes and send commands to the generating element 12 or other elements within the system or to outside elements and outside systems. For example, as previously stated if a trigger signal meets or exceeds the threshold value, the processing element 16 may be configured to shut off the generating element 12. Or the processing element 16 may send a communication signal to shut off another or second generating element (not shown) upstream of the first generating element 12 in order to regulate or turn off the optical signal or signals. If the threshold value is met or exceeded then the processing element 16 responds as if an operational condition has changed in the first fiber link 28 or the first component element 30. The change in operational conditions may be a decoupling of the first component element 30, which may lead to unsafe exposure to optical radiation to personnel. Therefore, by shutting off the optical signal or signals at the first generating element 12 based on the trigger signal, the system 10 includes an automatic shut-off feature to minimize the risk to humans from optical radiation exposure resulting from a decoupling or other fault within the system 10.

The processing element 16 may determine the threshold value based on historic data from the system 10 or receive the threshold value as an input from an operator or system designer, or other element within the system. In other embodiments, the processing element may be configured to be operable only in response to trigger signals equal to or greater than a preset threshold value determined by the operator or manufacturer of the processing element. In general, the threshold value may be determined by reviewing the known losses attributable to the component elements and fiber links of the system and the expected reflection characteristics of the component elements and fiber links under operational conditions within the system.

For example, in the embodiment illustrated in FIG. 1, the bi-directional coupler 18 may be configured such that approximately 95% of the optical signal that enters the first input port 22 is transmitted through the first output port 24 and 5% of the reflected optical signal that enters the first output port 24 is transmitted through the second output port 26. Also, as an example, the first component element 30 may be an optical connector and the first generating element 12 may be a laser. (dB stands for decibel and dBm means decibels with respect to one milliwatt.) In such case, the optical signal of the laser is transmitted through the first output port with a low loss of approximately 0.22 dB to the first fiber link 28 and the optical connector 30. The power reflected by the optical connector 30 and the first fiber link 28 is returned through the second output port 26 with a loss of approximately 13 dB and is collected at the converter element 20. An open connector 30 has reflectance of approximately 4% meaning that the reflected signal is an additional 14 dB weaker than that incident on the optical connector. As an example, the power of the optical signal generated by a laser of 200 mW (23 dBm) creates a reflected optical signal to the converter element 20 of approximately 23 dBm−(0.22+14+13) dB=−4.22 dBm (0.38 mW) for an opened optical connector. For coupled connectors and short fiber terminated links, the reflected signal is approximately 55 dB weaker and the reflected signal to the converter element 20 is approximately 23 dBm−(0.22+55+13) dB=−45.22 dBm (30 nW). Therefore the power of the reflected signal is approximately 41 dB greater when the connector 30 is uncoupled compared to when it is coupled.

It is understood that the above is only an example, and the magnitude of the losses and the power may vary. Moreover, in other embodiments, additional losses may be inherent or part of the system. For example, although the bi-directional coupler 18 may be configured for particular losses between the ports, the bi-directional coupler 18 may exceed the expected losses due to degradation or variation in the manufacturing, assembly, and maintenance of the bi-directional coupler. However, such losses may be measured and monitored and properly accounted for to determine the expected reflected signal or to detect differences in the reflected signal.

In addition to using the change in reflected signal or signals to determine changes in the operation conditions or the degradation of the elements within the system, a reflected signal may also be used to power the processing element 16. As explained above, the optical power of the reflected signal increases with an uncoupled component. The conversion of the increased optical power results in an increase in the power of the trigger signal from the converter element 20 to the processing element 16. The increased trigger signal may provide the power to operate the processing element. For example, the processing element 16 may include a controller switch (not shown) configured to break an electrical circuit (not shown) of the generating element (12) in order to cease generation of the optical signals in instances in which at least one trigger signal exceeds a predetermined threshold value. The increased trigger signal may provide the power for activating the switch and breaking the electrical circuit of the generating element 12.

Again as an example, in some embodiments of the present invention, the 41 dB increase in power between the uncoupled and coupled connector may provide the power level to activate the processing element 16. In other embodiments, breaks in the fiber links, fiber links extending over 25 km, or dirty connectors the power increase can drop in a range of 15 to 30 dB, which may also provide the power level to activate the processing element 16.

In addition to or instead of providing an automatic safety feature, the shut-off mechanism 14 according to some embodiments of the present invention, may monitor the reflected optical signal or signals for trends or possible interference with the transmitted optical signal or signals. As previously stated, a trend in the reflected optical signal or signals, such as a gradual increase in the reflected signal or signals over time, may indicate a level of degradation within the elements of the system. Also, optical signals reflected back within a network system interfere with the transmitted optical signal or signals by creating phase noise which is converted to an intensity noise that degrades the transmitted optical signal quality. Therefore, a second threshold level of the reflected signal may be set to correspond to a particular level of acceptable noise within the system. If the second threshold level is met or exceeded then the processing element 16 may send a signal or command to another element (not shown) within the system or outside the system or to an operator (not shown) indicating possible quality issues with the transmitted optical signal. And if the first threshold value, which is higher than the second threshold value, is met or exceeded then the processing element 16 may respond by instructing the first generating element or another element within the system to turn off the optical signal. In some embodiments, if the trigger value is between the first and second threshold value, the controller may indicate to the operator or to other elements of recommended or needed maintenance or cleaning of the system to reduce the noise the level, while not interfering with the generation or transmission of the optical signal or signals.

According to embodiments of the present invention, the processing element 16 may compare more than one reflected signal to the second threshold value. For example, the processing element 16 may not take any action unless four of five reflected signals are above the second threshold value. Comparing multiple reflected signals to the second threshold value can minimize the likelihood of the processing element 16 responding to a reflected signal created more by an abnormality within the system than to a particular condition within the system.

According to an embodiment of the present invention, a method is provided for monitoring the degradation and/or operational conditions of one or more elements within a system. In particular, according to the embodiment illustrated in FIG. 2, the method may include transmitting an optical signal from a first element to at least a second element 100 and receiving a reflected optical signal at the first element based on the optical signal and one or more reflection characteristics of the second element 110. The first element is connected to a third element that converts the received reflected optical signal into a trigger signal 120. The trigger signal is transmitted to a fourth element for responding to the trigger signal. The response may vary depending on a comparison of the trigger signal to a threshold value 130. If the electrical trigger signal is less than a threshold value then the transmission of the optical signal or subsequent optical signals may continue. However, if the trigger signal is equal to or greater than the threshold value then the fourth element may end the transmission of the optical signal or of subsequent optical signals 150.

In yet another embodiment, the method may further include a response based on the comparison of the electrical trigger signal to a second threshold value. According to this embodiment, the second threshold value is less than the first threshold value. If the electrical trigger signal is greater than or equal to the second threshold value then the fourth element may determine that an unacceptable level of noise is associated with the transmission of the optical signal. After such a determination, the fourth element may provide an indication to another element of the system or an operator regarding noise level and/or recommended maintenance activity.

Embodiments of the present invention may be part of various sub-systems of networks and network systems. For example, the shut-off features or noise monitoring features described herein may be part of fiber to the premises (FTTP), also referred to as fiber to the home (FTTH), systems using passive optical networks. A fiber to the premises system may include a provider's central office that delivers optical signals to a plurality of subscribers through a passive optical network or PON. The passive optical network may include an optical line terminal (OLT) at the provider's central office and a plurality of optical network terminals located at the premises of the subscribers, e.g. a customer home. The passive optical network may also include one or more optical network units that function as gateways to additional sub-networks associated with other systems, such as fiber to the curb (FTTC) and fiber to the neighborhood (FTTN) systems. The optical line terminal can be connected to the optical network terminals and optical network units through a series of fiber links and one or more splitters. To facilitate the transmission of the optical signals from the optical line terminal through the fiber links and to the optical network terminals and units, the optical line terminal may include an optical amplifier. In some embodiments, the optical amplifier may be the generating element 12 described herein and the shut-off mechanism may be configured to receive and transmit the optical signals from the optical amplifier.

The associated optical power for analog video transport at 1550 nm is 200 mW. The shut-off features according to some embodiments of the present invention may minimize inadvertent radiation exposure at these relative high power levels by automatically shutting off the optical signal or signals in response to an accidental cable or fiber break and uncoupled or opened connectors. As such, the first threshold value can be set to terminate the generation of the optical signal or signals. The noise monitoring features according to some embodiments of the present invention may help to ensure a higher quality optical signal by notifying the system or an operator of unacceptable noise levels. More specifically, the noise monitoring features may monitor for an increase of the electrical trigger signal or "return loss" of the system. An increase of the return loss greater than the second threshold value may be used to indicate a recommended maintenance activity such as cleaning and not necessarily interfere with the generation of the optical signal.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. Apparatus, comprising:
    an optical signal generator transmitting an optical signal along an optical transmission pathway to a downstream destination; and an optical shut-off mechanism configured to:
receive said optical signal from said optical signal generator and allow continued transmission of said optical signal along said optical pathway to said downstream destination;
receive a reflected optical signal from said downstream destination or from one or more locations along said optical pathway, said reflected optical signal derived from said optical signal;
convert said reflected optical signal to an electrical signal and compare said electrical signal against two predetermined thresholds, a first of said thresholds being higher than a second of said thresholds;
determine that an unacceptable level of noise is associated with said continued transmission when said electrical signal has a value between values corresponding to said thresholds and provide an indication of said unacceptable noise level to an operator; and
terminate said transmitting through operation of a trigger switch included within said mechanism, said transmitting termination occurring when said electrical signal has another value above said first threshold and when said trigger switch is also powered by said electrical signal having said another value;
wherein said mechanism further comprises:
a processing element for sending a communication signal to shut off a generating element upstream of said optical signal generator, thereby causing said transmitting termination, wherein said processing element is configured to determine at least one of said two predetermined thresholds based on historic data obtained from operation of said apparatus.

2. The apparatus of claim 1 wherein said processing element is configured to establish at least one of said two predetermined thresholds based on a threshold value received as an input from said operator.

3. The apparatus of claim 1, wherein said optical shut off mechanism further comprises:
trend monitoring apparatus for monitoring reflected optical signals including said reflected optical signal to determine reflected signal trends or possible interference with said transmitted optical signal.

4. The apparatus of claim 1, wherein said optical shut off mechanism is further configured to:
receive a minimum number of reflected optical signals from said downstream destination or from one or more locations along said optical pathway, said minimum number of optical signals being above said second threshold value, before said unacceptable noise level is indicated to said operator.

5. The apparatus of claim 1, utilized in a fiber to the premises (FTTP) network system or fiber to the home (FTTH) network system employing passive optical networks (PONs).

6. The apparatus of claim 5 wherein said PON includes at least one gateway to at least one sub-network associated with another system including fiber to the curb (FTTC) or fiber to the neighborhood (FTTN).

7. The apparatus of claim 1 wherein said optical signal generator is selected from the group of optical signal generators consisting of a laser, an optical amplifier, a regenerator of optical signals received from other than said laser or said optical amplifier and located within an optical system in which said apparatus operates, and said upstream generating element located outside of said optical system.

8. A method, comprising:
transmitting, from an optical signal generator, an optical signal along an optical transmission pathway to a downstream destination;
receiving a reflected optical signal from said downstream destination or from one or more locations along an optical pathway leading to said downstream destination, said reflected optical signal derived from said optical signal;
converting said reflected optical signal to an electrical signal and comparing said electrical signal against two preset thresholds, a first of said thresholds being higher than a second of said thresholds;
determining that a level of noise associated with said transmitted optical signal, when said electrical signal has a value between values corresponding to said thresholds, is an unacceptable level of noise;
providing an indication of said unacceptable noise level to an operator; and
terminating operation of said optical signal generator when said electrical signal has another value above said first threshold and when a switch, when operated, causes said terminating, said switch powered by said electrical signal having said another value;
wherein said method further comprises sending a communication signal to shut off a generating element upstream of said optical signal generator, thereby causing said transmitting termination and determining at least one of said two preset thresholds based on historic data obtained from previously performing said method.

9. The method of claim 7, further comprising:
establishing at least one of said two preset thresholds based on a threshold value received from said operator.

10. The method of claim 8, further comprising:
monitoring reflected optical signals including said reflected optical signal to determine reflected signal trends or possible interference with said transmitted optical signal.

11. The method of claim 8, further comprising:
receiving said minimum number of reflected optical signals above said second threshold value from said downstream destination or from one or more locations along said optical pathway, before said unacceptable noise level is indicated to said operator.

12. The method of claim 8 wherein said optical signal generator is selected from the group of optical signal generators consisting of a laser, an optical amplifier, a regenerator of optical signals received from other than said laser or said optical amplifier and located within an optical system by which said method is implemented, and said upstream generating element located, outside of said optical system.

* * * * *